United States Patent
Miyato et al.

(10) Patent No.: US 9,343,865 B2
(45) Date of Patent: May 17, 2016

(54) LASER DEVICE

(71) Applicants: Furukawa Electric Co., Ltd., Tokyo (JP); Komatsu Ltd., Tokyo (JP)

(72) Inventors: Taizo Miyato, Tokyo (JP); Kanji Tanaka, Tokyo (JP); Koji Kajiwara, Tokyo (JP); Akira Fujisaki, Tokyo (JP); Seiichi Hayashi, Tokyo (JP)

(73) Assignees: FURUKAWA ELECTRIC CO., LTD., Tokyo (JP); KOMATSU LTD., Tokyo (JP)

(*) Notice: Subject to any disclaimer, the term of this patent is extended or adjusted under 35 U.S.C. 154(b) by 0 days.

(21) Appl. No.: 14/688,709

(22) Filed: Apr. 16, 2015

(65) Prior Publication Data

US 2015/0229095 A1 Aug. 13, 2015

Related U.S. Application Data

(63) Continuation of application No. PCT/JP2013/077975, filed on Oct. 15, 2013.

(30) Foreign Application Priority Data

Oct. 16, 2012 (JP) ................. 2012-228990

(51) Int. Cl.
*H01S 3/091* (2006.01)
*H01S 3/0941* (2006.01)
(Continued)

(52) U.S. Cl.
CPC .......... *H01S 3/0912* (2013.01); *H01S 3/06716* (2013.01); *H01S 3/08009* (2013.01);
(Continued)

(58) Field of Classification Search
CPC . H01S 3/0912; H01S 3/06716; H01S 3/2308; H01S 3/09408; H01S 3/08009; H01S 3/094003; H01S 3/1312; H01S 3/0941; H01S 3/10069
USPC .............. 372/6, 29.015, 29.021, 38.1, 38.02, 372/38.06
See application file for complete search history.

(56) References Cited

U.S. PATENT DOCUMENTS 6,690,508 B2 2/2004 Tian et al.
7,006,282 B2 2/2006 Tian et al.
(Continued)

FOREIGN PATENT DOCUMENTS

EP 1 349299 A1 10/2003
JP 11-261146 A 9/1999
(Continued)

OTHER PUBLICATIONS

International Search Report mailed Nov. 26, 2013 for PCT/JP2013/077975 filed Oct. 15, 2013 with English Translation.
(Continued)

*Primary Examiner* — Dung Nguyen
(74) *Attorney, Agent, or Firm* — Oblon, McClelland, Maier & Neustadt, L.L.P.

(57) ABSTRACT

A laser device includes an optical fiber laser unit including an amplification optical fiber, a plurality of pumping light sources outputting pumping lights for optically pumping the amplification optical fiber, and a controller controlling the pumping light sources. When an instruction value for supplying a predetermined driving electric current to each of the pumping light sources is input to the controller, the controller conducts a control of supplying a compensated electric current value as a driving electric current obtained by multiplying an initial electric current value corresponding to the instruction value by a compensation coefficient and supplying the compensated electric current value to each of the pumping light sources. The compensation coefficient is set to restrain a decrease in a power with time of a laser light output from the optical fiber laser unit.

10 Claims, 2 Drawing Sheets

(51) Int. Cl.
*H01S 3/094* (2006.01)
*H01S 3/131* (2006.01)
*H01S 3/08* (2006.01)
*H01S 3/23* (2006.01)
*H01S 3/067* (2006.01)
*H01S 3/10* (2006.01)

(52) U.S. Cl.
CPC ........... *H01S3/0941* (2013.01); *H01S 3/09408* (2013.01); *H01S 3/094003* (2013.01); *H01S 3/1312* (2013.01); *H01S 3/2308* (2013.01); *H01S 3/067* (2013.01); *H01S 3/10069* (2013.01)

(56) References Cited

U.S. PATENT DOCUMENTS

| | | |
|---|---|---|
| 7,038,769 B2 | 5/2006 | Komaki |
| 8,422,890 B2 | 4/2013 | Mimuro et al. |
| 2009/0016387 A1 | 1/2009 | Durkin et al. |
| 2011/0206074 A1 | 8/2011 | Durkin et al. |
| 2011/0216790 A1 | 9/2011 | Durkin et al. |

FOREIGN PATENT DOCUMENTS

| | | | |
|---|---|---|---|
| JP | 2005-175272 A | | 6/2005 |
| JP | 2007-114335 A | | 5/2007 |
| JP | 2007-134626 A | | 5/2007 |
| JP | 2007-190566 A | | 8/2007 |
| JP | 2009-220161 A | | 10/2009 |
| JP | 2011-187825 | * | 9/2011 |
| JP | 2011-187825 A | | 9/2011 |
| JP | 2010-263188 A | | 11/2011 |
| JP | 2013-197332 A | | 9/2013 |
| WO | WO 2007/132182 A2 | | 11/2007 |

OTHER PUBLICATIONS

International Written Opinion mailed Nov. 26, 2013 for PCT/JP2013/077975 filed Oct. 15, 2013.

* cited by examiner

LASER DEVICE

CROSS-REFERENCE TO RELATED APPLICATION

This application is a continuation of PCT International Application No. PCT/JP2013/077975 filed on Oct. 15, 2013 which claims the benefit of priority from Japanese Patent Application No. 2012-228990 filed on Oct. 16, 2012, the entire contents of which are incorporated herein by reference.

BACKGROUND OF THE INVENTION

1. Field of the Invention
The present invention relates to a laser device.
2. Description of the Related Art
Conventionally, laser devices for laser-processing using a carbon dioxide gas laser or an optical fiber laser are disclosed (see Japanese Laid-open Patent Publication No. H11-261146, Japanese Laid-open Patent Publication No. 2007-190556, Japanese Laid-open Patent Publication No. 2007-134626, Japanese Laid-open Patent Publication No. 2007-114335, hereinafter to be referred to as Patent Literatures 1 to 4, respectively).

SUMMARY OF THE INVENTION

It is an object of the present invention to at least partially solve the problems in the conventional technology.

In accordance with one aspect of the present invention, a laser device includes an optical fiber laser unit including an amplification optical fiber, a plurality of pumping light sources outputting pumping lights for optically pumping the amplification optical fiber, and a controller controlling the pumping light sources. When an instruction value for supplying a predetermined driving electric current to each of the pumping light sources is input to the controller, the controller conducts a control of supplying a compensated electric current value as a driving electric current obtained by multiplying an initial electric current value corresponding to the instruction value by a compensation coefficient and supplying the compensated electric current value to each of the pumping light sources. The compensation coefficient is set to restrain a decrease in a power with time of a laser light output from the optical fiber laser unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
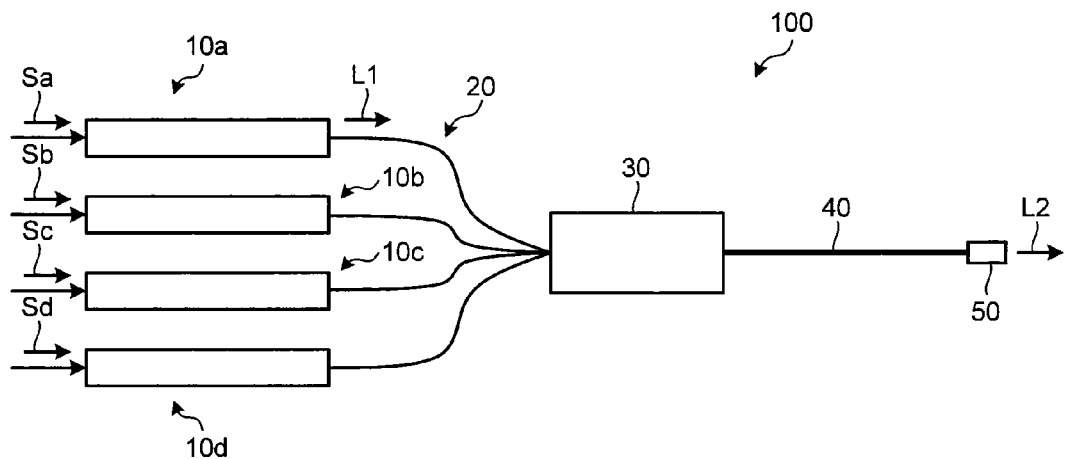
FIG. 1 is a schematic view of a configuration of a laser device according to an embodiment.

Hereafter, embodiments of a laser device according to the present invention will be explained in detail with reference to the drawings. These embodiments do not limit the present invention. In all the drawings for embodiments below, identical or equivalent elements are given same reference numerals to omit explanations for convenience. The drawings are schematic depictions, and do not represent the actual relation between a width and a thickness of each layer and ratios of the layers. Different drawings may include portions using different scales and dimensional relations.

In order to stabilize, processing quality of a laser-processing laser device, it is preferable that the power of an emitted laser light be stable, for example. In the Patent Literatures 1 and 2, a control is conducted in which the power of the laser light is monitored and the power of the laser light is maintained based on a result of the monitoring.

However, since the power of the laser light used for laser processing is extremely high, e.g. equal to or greater than 1 kW, highly accurate monitoring of highly intense light may be difficult sometimes in the methods disclosed in Patent Literatures 1 and 2; and thus, the power of the emitted laser light becomes instable actually. Since such instable output may cause a laser light to be output with a power higher or lower than that anticipated sometimes; and thus there is a problem of an instable processing quality or the like. In a case where a means of controlling to maintain the power of the emitted laser light as disclosed in Patent Literatures 3 and 4 is not provided, since a periodical maintenance by an operator is necessary to maintain the power of the laser light for example, there is a problem that the device becomes complicated to handle.

In contrast, the embodiments described below obtain an effect of outputting a laser light with stable power since the laser light is restrained from decrease in its power with time.

FIG. 1 is a schematic view of a configuration of a laser device according to an embodiment. A laser device 100 includes four optical fiber laser units 10a, 10b, 10c, and 10d, seven delivery optical fibers 20, an optical multiplexer 30, an output optical fiber 40, and an optical connector 50.

The four optical fiber laser units 10a, 10b, 10c, and 10d receive instruction signals Sa, Sb, Sc, and Sd input from outside respectively to operate and output single mode laser lights L1 respectively. The instruction signals Sa, Sb, Sc, and Sd will be explained later.

The seven delivery optical fibers 20 are single-mode optical fibers and connected to an input port of the optical multiplexer 30. Four of the seven delivery optical fibers 20, which are connected to the optical fiber laser units 10a, 10b, 10c, and 10d, propagate the laser light L1 in single mode to the optical multiplexer 30.

The optical multiplexer 30 is configured by a tapered fiber bundle (TFB) having seven input ports to which lights to be multiplexed are input, for example.

The optical multiplexer 30 multiplexes the laser lights L1 propagated through the four delivery optical fibers 20 to output to the output optical fiber 40.

The output optical fiber 40 is a multi-mode optical fiber through which the laser light L1 multiplexed by the optical multiplexer 30 is propagated in multi-mode.

An output light L2, i.e., the multiplexed laser lights L1 propagated through the output optical fiber 40 are output from the optical connector 50. An light-emitting end surface of the optical connector 50 is perpendicular to the optical axis of the output optical fiber 40, and an AR coating is applied on the light-emitting end surface so that a reflectivity thereof is approximately equal to or smaller than 0.5%.

Figure 2:
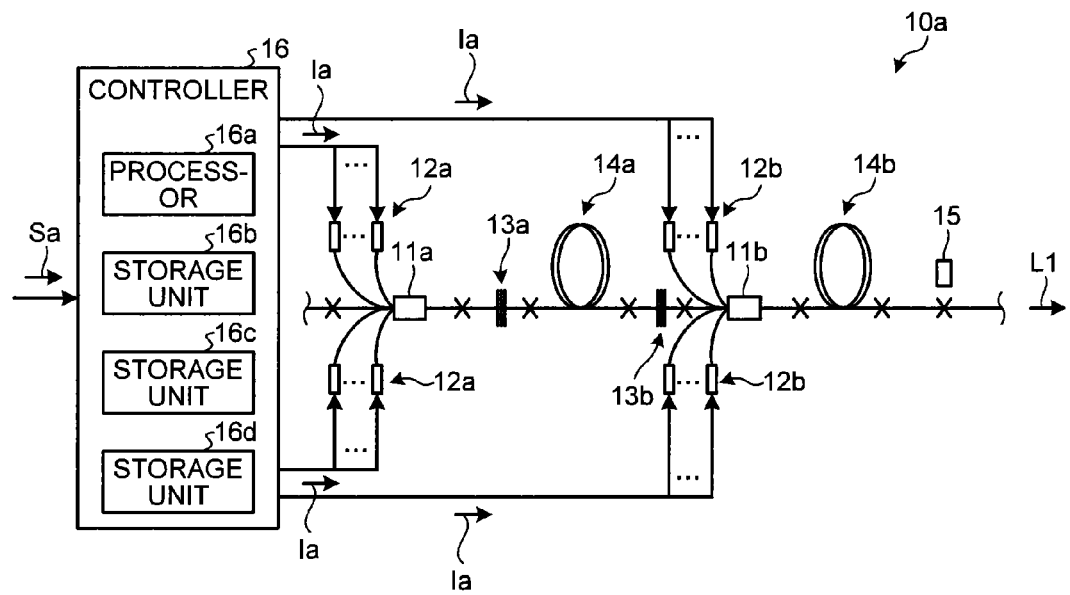
FIG. 2 is a schematic view of an optical fiber laser unit shown in FIG. 1.

FIG. 2 is a schematic view of an optical fiber laser unit 10a shown in FIG. 1. The others, i.e., the optical fiber laser units 10b, 10c, and 10d can be configured similarly to the optical fiber laser unit 10a. As shown in FIG. 2, the optical fiber laser unit 10a includes an optical multiplexer 11a, a plurality of semiconductor pumping lasers 12a as pumping light sources, a fiber bragg grating (FBG) 13a, an amplification optical fiber 14a, an FBG 13b, an optical multiplexer 11b, a plurality of semiconductor pumping lasers 12b, an amplification optical fiber 14b, an optical detector 15, and a controller 16. In the drawing, a symbol "x" indicates a fusion-spliced portion of the optical fibers. An output side of the amplification optical fiber 14b configures a part of the delivery optical fiber 20. The optical fiber laser unit 10a has a master oscillator power amplifier (MOPA) structure.

The optical multiplexer 11a is configured by a TFB, for example. The optical multiplexer 11a multiplexes the pumping lights output from the plurality of semiconductor pumping lasers 12a and outputs to the amplification optical fiber 14a. A wavelength of the pumping light is 915 nm for example, but not limited to a specific wavelength as long as optical pumping of the amplification optical fiber 14a is possible.

The amplification optical fiber 14a is a double-cladding type of ytterbium-doped optical fiber (YDF) in which a core portion made of silica-based glass is doped with an ytterbium (Yb) ion as an amplification substance, and in which an inner cladding layer made of a silica-based glass and an outer-cladding layer made of resin or the like are formed on an outer periphery of the core portion in this order.

A center wavelength of the FBG 13a is 1084 nm, for example. A reflectivity at the center wavelength and at a nearby wavelength band thereof in approximately 2 nm width is approximately 100%. The FBG 13a causes most of light at the wavelength of the pumping light, i.e., the wavelength of 915 nm to be transmitted therethrough. A center wavelength of the FBG 13b is substantially the same as that of the FBG 13a, e.g., 1084 nm. A reflectivity of the FBG 13b at the center wavelength is approximately 10 to 30%. A full width at half maximum of a reflection wavelength band of the FBG 13b is approximately 1 nm. The FBG 13b causes most of the light at the wavelength of 915 nm to be transmitted therethrough.

Therefore, the FBGs 13a and 13b and the amplification optical fiber 14a therebetween configure an optical fiber resonator for the light of a wavelength of 1084 nm. The center wavelength of the FBGs 13a and 13b is not limited to 1084 nm and may be within a range of emission wavelength of the amplification optical fiber 14a.

The optical multiplexer 11b configured by a TFB for example, multiplexes pumping lights, at a wavelength of 915 nm for example, which is output from the plurality of semiconductor pumping lasers 12b and outputs to the amplification optical fiber 14b.

The amplification optical fiber 14b is also a double-cladding type of YDF having a configuration similar to that of the amplification optical fiber 14a.

The optical detector 15 is a photo-diode for example, and is disposed in the vicinity of a fusion-spliced portion at an output side of the optical fiber laser unit 10a. The optical detector 15 is used for monitoring the power of the laser light L1 output from the optical fiber laser unit 10a.

The controller 16 includes a processor 16a, a storage unit 16b, a storage unit 16c, and a storage unit 16d.

The processor 16a conducts various processing for controlling the optical fiber laser unit 10a and is configured by a central processing unit (CPU), for example. The storage unit 16b stores therein various programs and data or the like used by the processor 16a for conducting the processing and is configured by a read only memory (ROM), for example. The storage unit 16c is used as an operation space or the like when the processor 16a conducts the processing, and is configured by a random access memory (RAM) for example. The storage unit 16d stores a result or the like of the processing of the processor 16a and is configured by an electrically erasable programmable read-only memory (EEPROM) or an ferro-electric RAM which are a nonvolatile memories, for example.

Hereafter an operation of the laser device 100 will be explained. At first, the instruction signal Sa (for example, voltage signal) is input from outside to the controller 16 in the optical fiber laser unit 10a. When the instruction signal Sa is input thereinto, the controller 16 supplies driving electric currents Ia to the plurality of semiconductor pumping lasers 12a and 12b respectively based on the instruction signal Sa. The semiconductor pumping lasers 12a output pumping lights with optical powers corresponding to current values of the driving electric currents Ia supplied thereto. The optical multiplexer 11a multiplexes each of the pumping lights output from the semiconductor pumping lasers 12a and outputs it to the amplification optical fiber 14a.

In the amplification optical fiber 14a, the Yb ion in the core portion is optically pumped by the pumping light, and a light having a band including the wavelength of 1084 nm is emitted. The emitted light at the wavelength of 1084 nm is subjected to laser oscillation by an optical amplification function of the amplification optical fiber 14a and a function of an optical resonator configured by the FBGs 13a and 13b.

On the other hand, the semiconductor pumping laser 12b also outputs a pumping light with an optical power corresponding to a current value of the driving electric current Ia supplied to the semiconductor pumping laser 12b. When the oscillated laser light and the pumping light from the semiconductor pumping laser 12b are input to the amplification optical fiber 14b by the optical multiplexer 11b, the amplification optical fiber 14b amplifies the laser light. The amplified laser light is output as the laser light L1 from the optical fiber laser unit 10a. The power of the laser light L1 is 500 W, for example. The total number of the semiconductor pumping lasers 12a and 12b for use is set in accordance with a desirable power of the laser light L1, a power of the pumping light per one semiconductor pumping laser, and a power conversion effectivity of the optical fiber laser unit 10a from the pumping light to the laser light L1. The total number of the semiconductor pumping lasers 12a and 12b for use is 15×4=60, for example.

In the optical fiber laser unit 10a, the optical fiber through which the laser light at the wavelength of 1084 nm passes is configured so that the laser light propagates in single mode.

Also, when the instruction signals Sb, Sc, and Sd are input from outside respectively, the other optical fiber laser units 10b, 10c, and 10d output laser lights L1 by an effect similar to that of the optical fiber laser unit 10a.

The delivery optical fibers 20 propagate the laser lights L1 output from each of the optical fiber laser units 10a, 10b, 10c, and 10d.

The optical multiplexer 30 multiplexes the laser lights L1 to output the output optical fiber 40. The output optical fiber 40 propagates the laser lights L1 multiplexed by the optical multiplexer 30 in multi-mode.

The optical connector 50 outputs the laser lights L1 propagated by the output optical fiber 40 as the output light L2. The power of the output light L2 is, for example, 2000 W. The output light L2 is guided and irradiated to a workpiece and used for conducting a laser processing such as cutting of the workpiece.

The power of the laser light L1 output by the optical fiber laser unit 10a is monitored by receiving a leak light of the laser light L1 from a nearby fusion-spliced portion by the optical detector 15.

When the instruction signals Sa, Sb, Sc, and Sd stop being input from outside to the optical fiber laser units 10a, 10b, 10c, and 10d, the optical fiber laser units 10a, 10b, 10c, and 10d stop driving. If the instruction signals Sa, Sb, Sc, and Sd are continuous wave (CW) signals, the optical fiber laser units 10a, 10b, 10c, and 10d can be subjected to a CW driving, and if the instruction signals Sa, Sb, Sc, and Sd are modulation signals such as a pulse and the like, the optical fiber laser units 10a, 10b, 10c, and 10d can be subjected to a modulation driving.

Hereafter an operation of the controller 16 will be explained more specifically. In the storage unit 16b, a data table is stored in which an instruction value of the instruction signal Sa from outside (for example, voltage value) are made correspond to a current value of the driving electric current Ia to be supplied to each of the semiconductor pumping lasers 12a and 12b when the instruction value is input. The current value is set so that, when a driving electric current at the current value is supplied to each of the semiconductor pumping lasers 12a and 12b, the power of the laser light L1 output from the optical fiber laser unit 10a is of a predetermined value corresponding to the instruction value. Regarding the data table, although one data table is prepared to all the semiconductor pumping lasers 12a and 12b, one data table may be prepared to every one of the semiconductor pumping lasers 12a and 12b.

Meanwhile, the instruction value and the current value (i.e., an initial electric current value) of the data table stored in the storage unit 16b are values set prior to using the laser device 100 (for example, prior to shipment of the laser device 100). If an accidental fault or the like occurs to an arbitrary one of the semiconductor pumping lasers 12a and 12b, the pumping light is not output from the fault semiconductor pumping laser. In this case, even if the driving electric current Ia at the initial electric current value according to the data table stored in the storage unit 16b is supplied to each of the semiconductor pumping lasers 12a and 12b when the predetermined instruction signal Sa is input, the power of the laser light L1 output from the optical fiber laser unit 10a is lower than the predetermined set value because the sum of the pumping light powers decreases. As a result, the power of the output light L2 to be used for the laser processing becomes lower than the predetermined desirable set value. In general, a degree of such a decrease in the power of the output light L2 increases with time.

To address this, the present embodiment is configured to supply the driving electric current Ia at the compensated electric current value obtained by multiplying the initial electric current value according to the data table stored in the storage unit 16b by a compensation coefficient to each of the semiconductor pumping lasers 12a and 12b when the predetermined instruction signal Sa is input. The compensated electric current value is set so that the power of the laser light L1 output from the optical fiber laser unit 10a becomes the predetermined value corresponding to the instruction value when an electric current at the compensated electric current value is supplied to each of the normally-working semiconductor pumping lasers 12a and 12b. Hereby the decrease in the power of the laser light L1 with time can be restrained.

A formula (1) below holds true where Iini is an initial electric current value included in the data table, Icor is a compensated electric current value, and a is a compensation coefficient.

$$I_{cor} = \alpha \times I_{ini} \tag{1}$$

The present embodiment is configured to supply the driving electric current Ia at the compensated electric current value obtained by multiplying the initial electric current value by the compensation coefficient to each of the semiconductor pumping lasers 12a and 12b when the instruction signal Sa is input in the optical fiber laser unit 10a. Hereby since the decrease in the sum of the pumping light power is restrained even if a few of the semiconductor pumping lasers 12a and 12b is in fault, for example, the decrease in the power of the laser light L1 can be restrained; and thus, the laser light L1 can be output with a stable power. Since the driving electric current at the compensated electric current value obtained by multiplying the initial electric current value by the compensation coefficient is supplied to each of the semiconductor pumping lasers when the instruction signals Sb, Sc, and Sd are input to the other optical fiber laser units 10b, 10c, and 10d respectively, the laser light L1 can be output with a stable power. Therefore, the laser device 100 is capable of also outputting the output light L2 with a stable constant power.

Although it is preferable that the compensation coefficient α be set for each of the optical fiber laser units 10a, 10b, 10c, and 10d, one compensation coefficient α may be set for all of the optical fiber laser units 10a, 10b, 10c, and 10d.

The compensation coefficient α can be obtained by an processing by the processor 16a of the controller 16. Hereafter, an example for the compensation coefficient α will be explained specifically.

(Compensation Coefficient α in Consideration of Accidental Fault of Semiconductor Pumping Laser)

For example, a failure rate for the accidental fault of the semiconductor pumping laser depends on an accumulated driving time, driving electric current, and an environment temperature or the like of the semiconductor pumping laser. Herein the failure rate is a statistical quantity indicating how many chips will meet accidental fault per a unit time when a large number of chips of the semiconductor pumping lasers are operated.

Figure 3:
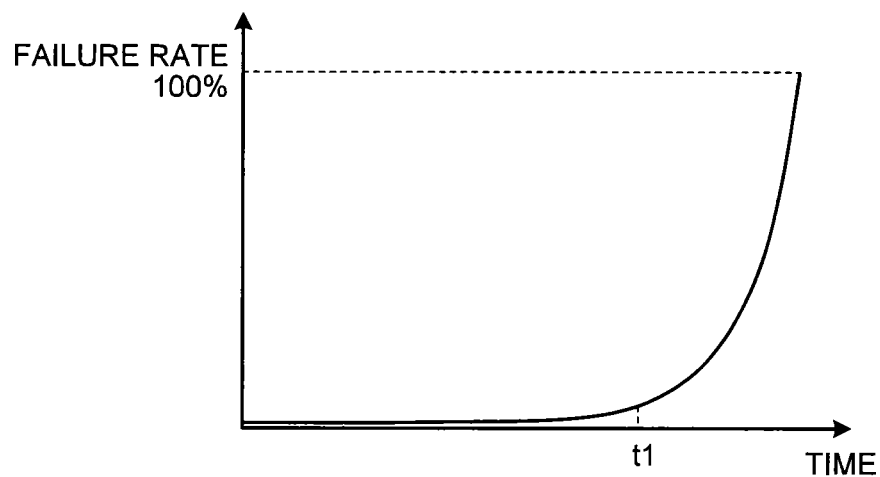
FIG. 3 is a view of an example of dependency of a failure rate of a semiconductor pumping laser on an accumulated driving time.

FIG. 3 is a view of an example of dependency of a failure rate of a semiconductor pumping laser on an accumulated driving time. FIG. 3 shows a case where the driving electric current and the environment temperature are set at fixed values. The horizontal axis indicates the accumulated driving time. Herein the accumulated driving time is an accumulation of time during which the semiconductor pumping laser is driven, i.e., time during outputting the pumping light by supplying an electric current from the start of using. As shown in FIG. 3, the failure rate of the semiconductor pumping laser undergoes a transition of a small value approximately in proportion to elapse of time until reaching a predetermined driving time t1, and tends to increase rapidly after the driving time t1. For example, the driving time t1 is 10,000 hours.

Therefore, α can be indicated as a function of the accumulated driving time of the semiconductor pumping laser, e.g., a multinomial expression such as a linear function, quadratic function, cubic function and the like. A formula (2) is a case of indicating α(t) in cubic function.

$$\alpha(t) = a \times t^3 + b \times t^2 + c \times t + 1 \tag{2}$$

Herein t is the accumulated driving time. In the formula (2), a, b, and c are coefficients that can be set to compensate for the decrease in the sum of the pumping light power in consideration of dependency of the failure rate on the accumulated driving time as shown in FIG. 3, and can be set based on, for example, proven values or the like of the failure rate of a semiconductor pumping laser of a kind similar to that of the semiconductor pumping laser for use.

In a case where the accumulated driving time t is zero in the formula (2), α(0)=1 holds true, and Icor=Iini holds true in the formula (1).

In a case where the laser device uses the optical fiber laser unit as shown in the present embodiment, no means are usually provided for mechanically blocking the oscillated laser light between the optical fiber laser unit and the optical connector as an output portion of the laser device. In this case, since the accumulated driving time t of the semiconductor pumping laser is of a value that is the same as the accumulated time H during which the laser light L1 is output by the laser oscillation of the optical fiber laser unit (hereafter accumulated oscillation time), the accumulated oscillation time H may be used in the formula (2) in place of the accumulated driving time t.

Thus, the compensation coefficient α(t) is a function of the accumulated driving time t. In the present embodiment, in the controller 16, the processor 16a is configured to monitor the driving states of the semiconductor pumping lasers 12a and 12b in accordance with the program stored in the storage unit 16b, accumulate the driving time from the start of using the laser device 100, writing and storing the accumulated driving time t in the storage unit 16d, and update the value thereof. Although the accumulated driving time t may be stored by the storage unit 16c temporarily, in this case, the accumulated driving time t is written in the storage unit 16d as a nonvolatile memory when the use of the laser device 100 is stopped (when power is turned off).

Then, the processor 16a reads out the accumulated driving time t stored in the storage unit 16d, conducts an arithmetic processing in accordance with the program stored in the storage unit 16b to calculate the compensation coefficient α(t), and writes the compensation coefficient α(t) in the storage unit 16d to update the value thereof. The compensation coefficient α(t) may also be stored in the storage unit 16c temporarily.

Then, when the predetermined instruction signal Sa is input, the processor 16a reads out the compensation coefficient α(t) stored in the storage unit 16d. Then, the processor 16a conducts a processing of calculating the compensated electric current value by multiplying the initial electric current value of the data table stored in the storage unit 16d by the compensation coefficient in accordance with the program stored in the storage unit 16b, and supplies the compensated electric current value as the driving electric current Ia to each of the semiconductor pumping lasers 12a and 12b. Hereby the optical fiber laser unit 10a is capable of outputting a desirable optical power of laser light L1 stably. Finally, the laser device 100 is also capable of outputting a desirable optical power of output light L2 stably.

The driving states of the semiconductor pumping lasers 12a and 12b can be monitored at a predetermined sampling time cycle (for example, a period of 1 μs). The accumulated driving time t may be written in the storage unit 16d at every sampling, or alternatively at a longer time cycle including a plurality of sampling time cycles (for example, a period of 200 ms). Regarding the accumulated driving time t, if it is observed by monitoring that the semiconductor pumping lasers 12a and 12b are driven at least once within, for example, a writing cycle (for example, 200 ms), it may be configured that, at a time of writing, the cycle (200 ms) may be added to the value of an immediate preceding accumulated driving time t to be written as a new accumulated driving time t. Alternatively, the accumulated driving time t may be stored in the storage unit 16c at the period of 200 ms and written in the storage unit 16d as a nonvolatile memory at a longer cycle (for example, two-minute cycle).

The compensation coefficient α(t) may be updated successively while using the laser device 100, or may be updated, for example, during an initial setup process after turning on the power of the laser device 100.

The compensation coefficient α(t) increases along with an increase in the driving time t. However, if the compensation coefficient α(t) increases excessively, there may be a case where the compensated electric current value Icor increases and, for example, exceeds the rated currents of the semiconductor pumping lasers 12a and 12b. To prevent this, it is preferable that an upper limit value be set for the compensation coefficient α(t). For example, if the upper limit value is 1.4, $1 \leq \alpha/\alpha(t) \leq 1.4$ holds true. It is preferable that supply of the driving electric current Ia to the semiconductor pumping lasers 12a and 12b be stopped if the compensation coefficient α(t) exceeds the upper limit value. If the controller 16 is provided with an alarm generator and the compensation coefficient α(t) exceeds the upper limit value, the alarm generator may produce a sound or graphic alarm.

The dependency of the failure rate on the accumulated driving time shown in FIG. 3 indicates a case where the driving electric current and the environment temperature are set at fixed values. However, in an actual state, there will be a case where the laser device 100 is used by changing the driving electric currents supplied to the semiconductor pumping lasers 12a and 12b and changing the power of the output light L2 from the laser device 100. Since loads on the semiconductor pumping lasers 12a and 12b change if the driving electric currents supplied to the semiconductor pumping lasers 12a and 12b are changed, a curve for the dependency of the failure rate on the accumulated driving time may change.

In this case, the information on the load on the semiconductor pumping lasers 12a and 12b may be incorporated in the compensation coefficient α(t).

For example, the compensation coefficient α(t) may be set as a formula (3) below by using an accumulated electric current value Isum as an accumulated value of the compensated electric current value Icor having been supplied so far to the semiconductor pumping lasers 12a and 12b.

$$\alpha(t, Isum) = a(Isum) \times t^3 + b(Isum) \times t^2 + c(Isum) \times t + 1 \quad (3)$$

Herein a (Isum), b (Isum), and c (Isum) are functions for the accumulated electric current value Isum, and α(t, Isum) is also a function for the accumulated electric current value Isum.

The accumulated electric current value Isum may be an accumulated value of the sum of the compensated electric current value Icor having been supplied to each of the semiconductor pumping lasers 12a and 12b so far. The accumulated electric current value Isum may be written in the storage unit 16d to be updated in value as an accumulated value of the compensated electric current value Icor from the start of using the laser device 100 when monitoring the driving states of the semiconductor pumping lasers 12a and 12b.

The load on the semiconductor pumping lasers 12a and 12b can be indicated as an average value of the sum of the power of the pumping light output from each of the semiconductor pumping lasers 12a and 12b. For example, the compensation coefficient α(t) may be set below by using an average output power W as a time average value of the sum of the power of the pumping light having been output so far actually from each of the semiconductor pumping lasers 12a and 12b.

$$\alpha(t, W) = a(W) \times t^3 + b(W) \times t^2 + c(W) \times t + 1 \quad (4)$$

Regarding the average output power W, a value that is in proportion to the average output power W can be obtained by recording the accumulated electric current value Isum in the storage unit 16c by accumulating the compensated electric current value Icor at that time in a state of monitoring the driving states of the semiconductor pumping lasers 12a and 12b, reading out subsequently the accumulated electric current value Isum by the processor 16a when necessary, and conducting a processing of dividing the read out accumulated electric current value Isum by the accumulated driving time t. Therefore, the average output power W can be obtained by multiplying this value by a predetermined coefficient.

The power of the pumping light output from each of the semiconductor pumping lasers 12a and 12b can be monitored by a back facet monitor or the like of the semiconductor pumping lasers 12a and 12b. Therefore, the above-described average output power W may be obtained based on the power of the monitored pumping light.

Moreover, the above-described compensation coefficient $\alpha(t)$ may be set in consideration of a junction temperatures of the semiconductor pumping lasers 12a and 12b (LDs). For example, when Q indicates an amount of heat generated in the LD (herein Q is a value obtained by subtracting the optical power of the LD from an electric power injected into the LD (driving voltage×driving electric current)) and if a difference between an ambient temperature and a junction temperature of the LD is measured as $\Delta T$, the junction temperature of the LD is calculated as a value of the ambient temperature added to the $\Delta T$ of the LD. Herein, the ambient temperature is obtained by measuring a temperature of a heat sink on which the LD is mounted, a temperature of the casing of the LD, or an environment temperature at a place where the LD is disposed or the like. Since a thermal resistance between the point where the ambient temperature is measured and the junction is $\Delta T/Q$ (Q is an amount of heat produced by the LD), the thermal resistance may be calculated in advance and $\Delta T$ may be calculated relative to an arbitrary value of Q. The compensation coefficient $\alpha(t)$ in consideration of the junction temperature can be calculated by, for example, calculating an acceleration coefficient corresponding to the thus obtained $\Delta T$ in advance and multiplying. the entire compensation coefficient $\alpha(t)$ or each of the coefficients a to c of the formulae (2) to (4) by the acceleration coefficient.

Meanwhile, Icor=$\alpha(t)$×Iini holds true where Iini is an initial electric current value, Icor is a compensated electric current value, and $\alpha$ is a compensation coefficient as shown in the formula (1).

The compensation coefficient $\alpha(t)$ is set by assuming from a failure rate, that the sum of the power of the output pumping light is lower than that when t=0 even if an initial electric current value is supplied to the semiconductor pumping lasers 12a and 12b at the time of the accumulated driving time t and estimating its lowering degree. However, sometimes, the actual lowering degree deviates from an initial estimation. In this case, $\alpha(t)$×Iini set as the compensated electric current value Icor does not become a desirable sum of the power of the pumping light.

In this case, it is preferable that the compensation coefficient $\alpha(t)$ be calibrated. The calibration is executed by multiplying an initially-set $\alpha(t)$ by a predetermined calibration coefficient $\alpha 0$ and using $\alpha 0 \times \alpha(t)$ as a new compensation coefficient $\alpha 1(t)$. If it is set as $\alpha(t=0)=1$ in the formula (1), an initial electric current value Iini is supplied as the compensated electric current value Icor. It is possible to confirm how many number of the semiconductor pumping lasers 12a and 12b are actually in fault from an initial state (i.e., how much the sum of the power of the pumping light actually decreases) by obtaining the sum of the powers of the pumping lights output from each of the semiconductor pumping lasers 12a and 12b when the initial electric current value Iini and comparing the sum of the power of the pumping light with the sum of the power of the pumping light at the initial state (t=0). The calibration coefficient $\alpha 0$ may be determined based on the confirmed result.

(Compensation Coefficient $\alpha$ in Consideration of Photo-Darkening of Amplification Optical Fiber)

As described above, even if the driving electric current Ia at the initial electric current value is supplied to each of the semiconductor pumping lasers 12a and 12b according to the data table stored in the storage unit 16b, sometimes, the power of the laser light L1 output from the optical fiber laser unit 10a is lower than a predetermined set value. The cause of the power of the laser light L1 being lower than the predetermined set value is not only an accidental fault of the semiconductor pumping lasers 12a and 12b but also photo-darkening of the amplification optical fibers 14a and 14b which are YDFs for example. The photo-darkening is a phenomenon that the power of amplified light output from the YDF is decreased with time when the YDF conducts optical amplification. The photo-darkening is said to be caused by a color center formed in the YDF.

Figure 4:
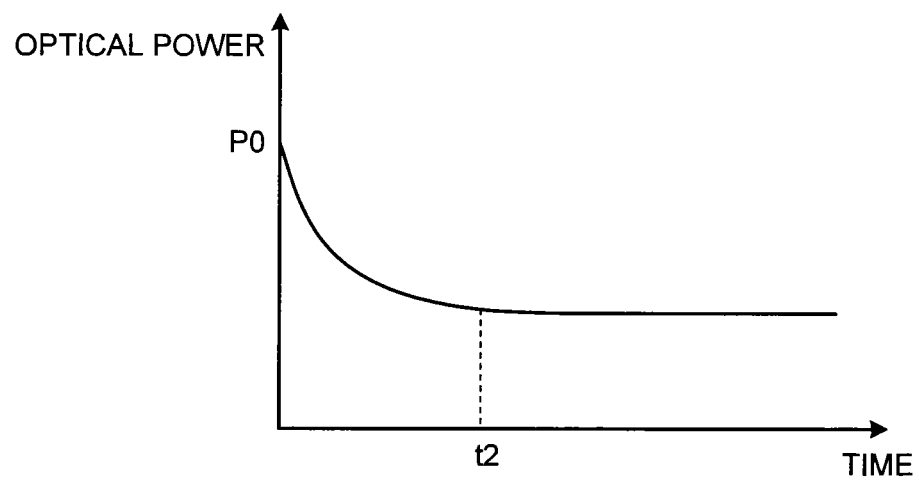
FIG. 4 is a view of an example of decreasing characteristics with time of power of a light output from an optical fiber laser unit by photo-darkening of an amplification optical fiber.

FIG. 4 is a view of an example of decreasing characteristics with time, of power of a light output from the optical fiber laser unit 10a caused by the photo-darkening of the amplification optical fibers 14a and 14b. The horizontal axis indicates an accumulated driving time of the optical fiber laser unit 10a (accumulated driving time of the semiconductor pumping lasers 12a and 12b). As shown in FIG. 4, the power of output light decreases from the default value PO gradually and becomes constant after driving time t2. The driving time t2 is, for example, 200 hours.

Therefore, in this case, $\alpha$ can be indicated as a function of the accumulated driving time of the semiconductor pumping laser, such as an exponential function, and a multinomial expression such as quadratic function, cubic function and the like. A formula (5) is a case of indicting $\alpha(t)$ in an exponential function.

$$\alpha(t)=\alpha 2+(1-\alpha 2)\times e(-f\times t) \quad (5)$$

Herein t is an accumulated driving time. Herein f and $\alpha 2$ are coefficients capable of being set so that the lowering of the sum of the pumping light power caused by the photo-darkening is compensated for in consideration of decreasing characteristics by the photo-darkening as shown in FIG. 4, and can be set by, for example, using a result or the like of an experiment for photo-darkening of a YDF that is of a similar kind to the YDF to be used.

In a case where the driving time t is zero in the formula (5), $\alpha(0)=1$ holds true; and thus, Icor=Iini holds true in the formula (1). If the driving time t increases to a sufficient degree, $\alpha(t)$ becomes a constant value $\alpha 2$.

Moreover, $\alpha$ may be used as indicated in a formula (6) or (7) below in consideration of both the accidental failure rate and the photo-darkening.

$$\alpha(t)=\{a\times t3+b\times t2+c\times t+1\}\times\{\alpha 2+(1-\alpha 2)\times e(-f\times t)\} \quad (6)$$

$$\alpha(t)=g\times t3+h\times t2+i\times t+1 \quad (7)$$

Herein g, h, and i are coefficients capable of being set so that the lowering of the sum of the pumping light power is compensated for in consideration of both the dependency of the failure rate on the driving time and the decreasing characteristics caused by the photo-darkening.

The function used as $\alpha(t)$ may be set in consideration of not only affection of the above-described accidental failure rate or the photo-darkening but also other causes of lowering the power of the output laser light L1 than the predetermined set value.

Although, in the above-described embodiment, the data table in which the instruction value of the instruction signal Sa corresponds to the initial electric current value Iini is stored by the storage unit 16b, it may be configured in which the storage unit 16b stores not the data table therein but a program for calculating the initial electric current value Iini based on the instruction value of the instruction signal Sa so that, when the instruction signal Sa is input, the processor 16a reads out the program for calculation and calculates the initial electric current value Iini.

Although the laser device is provided with the four optical fiber laser units in the above-described embodiment, the number of the optical fiber laser units is not limited specifically, and the laser device may be provided with one optical fiber laser unit or a plurality of optical fiber laser units.

The present invention is not limited to the above-described embodiment. The present invention includes a configuration of combining each of the above-described elements appropriately. In addition, further effects or modification examples can be derived by an ordinary skilled person in the art easily. Therefore, further wide aspects of the present invention are not limited to a specific detail, and various modifications may be made.

As described above, the laser device according to the present invention is useful as a laser device for laser-processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A laser device comprising:
an optical fiber laser unit including
an amplification optical fiber;
a plurality of pumping light sources configured to output pumping lights for optically pumping the amplification optical fiber; and
controller circuitry configured to control the pumping light sources, wherein
when an instruction value for supplying a predetermined driving electric current to each of the pumping light sources is input to the controller circuitry, the controller circuitry conducts a control of supplying a compensated electric current value as a driving electric current obtained by multiplying an initial electric current value corresponding to the instruction value by a compensation coefficient and supplying the compensated electric current value to each of the pumping light sources,
the compensation coefficient is set to restrain a decrease in a power with time of a laser light output from the optical fiber laser unit,
the compensation coefficient is a function of an accumulated driving time of each of the pumping light sources,
the plurality of the pumping light sources is a plurality of semiconductor pump lasers, and
the compensation coefficient is a function set to compensate for a decrease in a sum of powers of the pumping lights, the decrease depending on an accidental failure rate of chips of the plurality of the semiconductor pump lasers.

2. The laser device according to claim 1, wherein the compensation coefficient includes a multinomial expression of the accumulated driving time.

3. The laser device according to claim 1, wherein the controller circuitry includes:
a storage configured to store the accumulated driving time of each of the pumping light sources; and
processing circuitry configured to read out the stored accumulated driving time and calculate the compensation coefficient.

4. The laser device according to claim 1, wherein the compensation coefficient is further a function of a time average value of the sum of the powers of the pumping lights of the plurality of the pumping light sources.

5. The laser device according to claim 4, wherein the controller circuitry includes:
a storage configured to store an accumulated value of the compensated electric current value supplied to each of the pumping light sources; and
processing circuitry configured to read out the stored accumulated value and calculate the time average value of the sum of the powers of the pumping lights.

6. The laser device according to claim 1, wherein the controller circuitry is configured to calibrate the compensation coefficient by multiplying the compensation coefficient by a calibration coefficient.

7. The laser device according to claim 1, wherein the controller circuitry is configured to conduct at least one of stopping the driving electric current supplied to each of the pumping light sources and producing an alarm when the compensation coefficient exceeds an upper limit value.

8. A laser device comprising:
an optical fiber laser unit including
an amplification optical fiber;
a plurality of pumping light sources configured to output pumping lights for optically pumping the amplification optical fiber; and
controller circuitry configured to control the pumping light sources, wherein
when an instruction value for supplying a predetermined driving electric current to each of the pumping light sources is input to the controller circuitry, the controller circuitry conducts a control of supplying a compensated electric current value as a driving electric current obtained by multiplying an initial electric current value corresponding to the instruction value by a compensation coefficient and supplying the compensated electric current value to each of the pumping light sources,
the compensation coefficient is set to restrain a decrease in a power with time of a laser light output from the optical fiber laser unit,
the compensation coefficient is a function of an accumulated driving time of each of the pumping light sources,
the compensation coefficient is a function set to compensate for the decrease in the power of the laser light output from the optical fiber laser unit, the decrease being caused by a photo-darkening of the amplification optical fiber.

9. The laser device according to claim 8, wherein the compensation coefficient includes a multinomial expression or an exponential function of the accumulated driving time.

10. A laser device comprising:
an optical fiber laser unit including
an amplification optical fiber;
a plurality of pumping light sources configured to output pumping lights for optically pumping the amplification optical fiber; and
controller circuitry configured to control the pumping light sources, wherein when an instruction value for supplying a predetermined driving electric current to each of the pumping light sources is input to the controller circuitry, the controller circuitry conducts a control of supplying a compensated electric current value as a driving electric current obtained by multiplying an initial electric current value corresponding to the instruction value by a compensation coefficient and supplying the compensated electric current value to each of the pumping light sources, the compensation coefficient is set to restrain a decrease in a power with time of a laser light output from the optical fiber laser unit, the compensation coefficient is a function of an accumulated driving time of each of the pumping light sources, the plurality of the pumping light sources is a plurality of semiconductor pump lasers, the compensation coefficient is a function set to compensate for a decrease in a sum of powers of the pumping lights the decrease in the sum depending on an accidental failure rate of chips of the plurality of the semiconductor pump lasers, and the decrease in the power of the laser light output from the optical fiber laser unit, the decrease in the power being caused by a photo-darkening of the amplification optical fiber.

* * * * *